(12) United States Patent
Sun (10) Patent No.: US 9,952,407 B2
(45) Date of Patent: Apr. 24, 2018

(54) OPTICAL IMAGING ASSEMBLY

(71) Applicant: Vista Optronics, Inc, Xianmen (CN)

(72) Inventor: fengqing Sun, Austin, TX (US)

(73) Assignee: Vista Optronics, Inc., Xiamen (CN)

( * ) Notice: Subject to any disclaimer, the term of this patent is extended or adjusted under 35 U.S.C. 154(b) by 274 days.

(21) Appl. No.: 14/834,762

(22) Filed: Aug. 25, 2015

(65) Prior Publication Data

US 2017/0038560 A1 Feb. 9, 2017

(30) Foreign Application Priority Data

Aug. 7, 2015 (CN) .......................... 2015 1 0477286

(51) Int. Cl.
  *G02B 13/00* (2006.01)
  *G02B 9/60* (2006.01)
  *G02B 5/20* (2006.01)

(52) U.S. Cl.
  CPC ........... *G02B 13/0045* (2013.01); *G02B 9/60* (2013.01); *G02B 5/208* (2013.01)

(58) Field of Classification Search
  CPC ... G02B 9/60; G02B 9/62; G02B 9/64; G02B 13/0045
  USPC ................. 359/357, 714, 766, 765
  See application file for complete search history.

(56) References Cited

U.S. PATENT DOCUMENTS

| 7,394,602 | B2 | 7/2008 | Chen et al. |
| 7,436,603 | B2 | 10/2008 | Huang et al. |
| 7,443,613 | B2 | 10/2008 | Noda et al. |
| 7,468,847 | B2 | 12/2008 | Tang et al. |
| 7,679,841 | B2 | 3/2010 | Chen et al. |
| 7,684,128 | B2 | 3/2010 | Tang |
| 7,894,142 | B1 | 2/2011 | Tang |
| 7,898,747 | B2 | 3/2011 | Tang |
| 7,916,401 | B2 | 3/2011 | Chen et al. |
| 7,948,692 | B2 | 5/2011 | Tang et al. |
| 7,957,075 | B2 | 6/2011 | Tang |
| 7,974,014 | B2 | 7/2011 | Tang |

(Continued)

FOREIGN PATENT DOCUMENTS

| CN | 2824074 Y | 10/2006 |
| CN | 201220443768 | 3/2013 |

(Continued)

*Primary Examiner* — Darryl J Collins
*Assistant Examiner* — Journey Sumlar
(74) *Attorney, Agent, or Firm* — Treasure IP Group, LLC (57) ABSTRACT

An optical imaging module used in portable devices is described. In order from an object side to an image side, the module comprises an aperture stop, a first lens element with positive refractive power having a convex object-side surface and a convex image-side surface; a second lens element with negative refractive power having a concave image-side surface and a object-side surface being convex in a peripheral region; a third lens element with refractive power; a fourth lens element with refractive power having a convex image-side surface; a fifth lens element with positive refractive power having an image-side surface being concave in a paraxial region and convex in a peripheral region; and wherein the optical imaging module used in the portable devices satisfies: 0.052 mm≤D≤0.082 mm, where D represents a maximum effective focus shifts range under all the defocus curves at 0.4 modulus of the OTF (optical transfer function).

9 Claims, 8 Drawing Sheets

(56) References Cited

U.S. PATENT DOCUMENTS 8,000,033 B1     8/2011   Tang
8,081,393 B2   12/2011   Tang
8,094,231 B2     1/2012   Tsai
8,154,807 B2     4/2012   Tsai
8,988,789 B2     3/2015   Tang

FOREIGN PATENT DOCUMENTS

CN     2013103217767 A    7/2013
CN     204832664 U   *   8/2015

* cited by examiner

OPTICAL IMAGING ASSEMBLY

CROSS REFERENCE TO RELATED APPLICATION

This application claims priority to Chinese Application No. CN 201510477286.7, filed on Aug. 6, 2015. The Chinese Application is incorporated herein by reference in its entirety.

BACKGROUND OF THE INVENTION

1. Field of the Invention

The present invention relates to an optical imaging module and more particularly to an optical imaging module used in portable devices.

2. Description of the Prior Art

In recent years, the development of the optical lens module in digital cameras, web cameras and portable phone cameras becomes more rapid with the sharp increase in demand of people for high image capturing quality. High resolution, large field of view for sub camera, smaller size and etc are all considered more and more by consumers.

Generally, for the sake of meeting customers' demands, especially demands for high imaging resolution a conventional lens module is used to be a three-lens structure or a four-lens structure. But now the conventional structure was no longer capable to accomplish the mission, since the aberrations and the total track length of the optical system thereby cannot be further modified while achieving a high resolution or a larger field of view. Meanwhile, the manufacturer found it hard to maintain a high yield of lens module when trying to pursue a relative high imaging quality since the aspheric coefficients of lens elements are not preferable yet. Besides, the defocus state of a lens module will significantly influence the performance of the whole camera in auto-focusing, which was confirmed by the assembling factory.

How to achieve a quick focusing module with less aberrations, and balance the weight between high imaging quality and manufacturing feasibility is the key topics in lens module fabrication, therefore, there is need to construct a favorable lens module structure with a good adjustment of its structure and aspheric coefficients.

A patent CN202794682 discloses an optical imaging module which comprises five lens elements and at least a plat element, wherein the first lens element with positive refractive power has a convex object-side surface, the second lens element has negative refractive power, the third lens element, the fourth lens element and the fifth lens element are all have refractive power. This invention can achieve a shorter TTL by applying a plat element made by larger coefficient of linear thermal expansion. But the invention is not conducted through adjusting relationships between aspheric coefficients, not performed with a good defocus state either.

SUMMARY OF THE INVENTION

The present invention provides a five-element optical imaging module. With controlling the refractive power and key relationship between each aspheric coefficient, a good defocus state will be achieved while keep a high image quality of the optical imaging module.

According to one disclosure of the present invention, an optical imaging module includes, in order from an object side to an image side, an aperture stop, a first lens element with positive refractive power having a convex object-side surface and a convex image-side surface; a second lens element with negative refractive power having a concave image-side surface and a object-side surface being convex in a peripheral region; a third lens element with refractive power; a fourth lens element with refractive power having a convex image-side surface; a fifth lens element with positive refractive power having an image-side surface being concave in a paraxial region and convex in a peripheral region; wherein the optical imaging module used in portable devices satisfies:

0.052 mm≤D≤0.082 mm, where the D represents the maximum effective focus shifts range under all the defocus curves at 0.4 modulus of the OTF (optical transfer function).

In one optical imaging module of the present disclosure, the optical imaging module satisfies:

−0.311≤AC6/AC9≤−0.166.

−0.57≤AC7≤0.049.

−4.89≤AC2≤−3.67.

−0.342≤ASUM≤0.448.

where the AC6 and AC9 respectively represent the total aspheric coefficients of 6th and 9th lens surfaces in said optical imaging module, AC7 represents the total aspheric coefficients of 7th lens surfaces in said optical imaging module, AC2 represents the total aspheric coefficients of 2nd lens surfaces in said optical imaging module, and it satisfies the following relation: ASUM represents the total aspheric coefficients of 5th, 6th, 7th, 8th, 9th, 10th lens surfaces in said optical imaging module.

Parameters for non-spherical surfaces are basically defined by, but not limited to, the following aspheric surface profiles equation:

$$X(Y) = \frac{(Y^2/R)}{\left(\sqrt{1-(1+k)\frac{Y^2}{R^2}}\right)} + \sum_{i} Ai * Y^i$$

Where X is the relative distance between a point on the aspheric surface at a distance Y from the optical axis and the tangential plane at the aspheric surface vertex, Y is the distance from the point on the curve of the aspheric surface to the optical axis, R represents the curvature radius of the surface, k represents a conic factor and Ai represents an $i^{th}$-order aspheric coefficient of the lens surface. In the embodiments, i may be but not limited to 2, 4, 6, 8, 10, 12, 14, 16, 18.

DETAILED DESCRIPTION OF THE PREFERRED EMBODIMENTS

The optical imaging module of the present disclosure is described in greater detail with illustrating embodiments thereof.

In one present disclosure, the optical system with an optical imaging module, sequentially arranged from an object side to an image side along an optical axis, comprises an aperture stop, a first lens element, a second lens element, a third lens element, a fourth lens element, a fifth lens element and an IR-cut filter (infrared-cut filter) and an image plane. The aperture stop is deposed between the object-side and the first lens, which can control the margin light rays passing through to reduce flares and keep from ghost shadow or light spots. The first lens element with positive refractive power has a convex object side surface and a convex image side surface, which can increase the total light rays passing through the module. The second lens element with negative refractive power has a concave image-side surface and an object-side surface being convex in the peripheral region, which can balance the refractive power of the whole system and help to reduce the field curvature. The third lens element has refractive power which can modify the sensitivity of the system and achieves better chromatic performance. The fourth lens element has refractive power and a convex image-side surface which provides better modification on astigmatism and spherical aberration of the system. And it also can achieve favorable distortion performance since the image-side surface of the fourth lens element is aspheric surface. The fifth lens element with positive refractive power has an image-side surface being concave in the paraxial region and convex in the peripheral region, which allows the high order aberrations of the system to be favorably corrected while achieving higher resolution. An IR-cut filter is applied here to prevent infrared light from being absorbed by the sensor, which is able to maintain a steady image quality. In the aforementioned disclosure of optical imaging module, D represents the maximum effective focus shifts range under all the defocus curves at 0.4 modulus of the OTF, BFL is the back focal length, TTL is the total track length. AC2, AC6, AC7 and AC9 respectively represent the total aspheric coefficients of 2nd, 6th, 7th and 9th lens surfaces in said optical imaging module. T represents the total center thickness of five lens elements; AT represents the total center air thickness counted from the first lens element to the IR-cut filter. ASUM represents the total aspheric coefficients of 5th, 6th, 7th, 8th, 9th, 10th lens surfaces. $G_2$ is the center thickness of the 2nd lens element; $T_{12}$ is the center air thickness between the 1st lens element and the 2nd lens element.

When 0.052 mm<D<0.082 mm is satisfied, the depth of focus could achieve a larger value which is favorable for the auto-focusing in application.

The optical imaging module satisfies: −0.311≤AC6/AC9≤−0.166 so that the longitudinal aberration can be preferably reduced.

The relation of −0.570≤AC7≤0.049 will help to modify the chromatic aberrations of the system.

When −4.89≤AC2≤−3.67 is satisfied, it will be favorable to modified chromatic aberrations of the system.

When the relation −0.342≤ASUM≤0.448 is satisfied, the distortion and astigmatism can be effectively reduced, and also the resolution ability of the module will be improved to a higher level.

When the relation 1.23≤T/AT≤1.35 is satisfied, it will be favorable for field curvature correction of the optical imaging module.

When the relation 7.8≤G2/T12≤39.3 is satisfied, less off-axis aberrations could lead to obvious decrease in image quality.

If the relation 20.91≤TTL/BFL≤35.50 satisfied, the expectation for a relative compact system with good image quality can be achieved at the same time.

Rm is the absolute sum of negative radius for all the lens elements; Rt is the absolute sum of radius for all the lens elements. And they satisfy the relation: 3.72≤Rm/Rt≤3.77 so that the back focal length of the system can be preferably extended in favor of module packaging.

By confining the aspheric coefficients into specific range, the focus centers under 0, 0.6 and 0.9 field of view almost can be constrained in a line so that the optical imaging module could achieve large depth of focus while keep a good imaging quality. In practice, pictures taken by this lens module will be more clear than usual. Here, items like spherical aberration, field curvature and distortion were used to evaluate imaging quality, and for example, the value of distortion should be under 2%; the smaller the distances between three lines are in the longitudinal aberration, the better the chromatic property is. Also, smaller space between S and T curves will be better. In each aberration figure, the Y-axis is the value of image height in millimeters.

Figure 1:
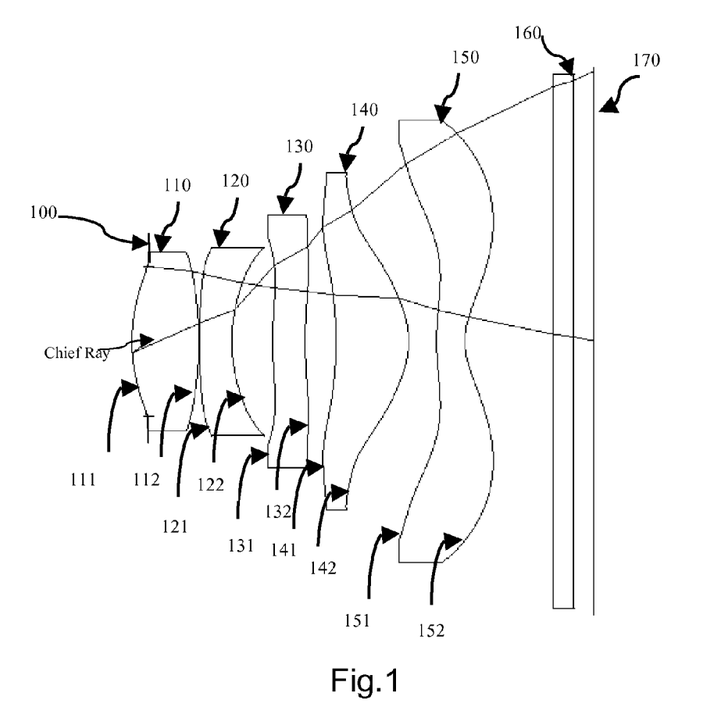
FIG. 1 shows an optical imaging module in accordance with a first embodiment for the disclosure.

Referring to FIG. 1 to 1C for the first embodiment of the present invention, the optical imaging module, sequentially arranged from an object side to an image side along an optical axis, comprises an aperture stop 100, a first lens element 110, a second lens element 120, a third lens element 130, a fourth lens element 140, a fifth lens element 150, an IR-cut filter 160 and an image plane 170, wherein all the lens elements 110, 120, 130,140 and 150 are made of plastic.

The first lens element 110 with positive refractive power has a convex object side surface 111 and a convex image side surface 112.

The second lens element 120 with negative refractive power has an object side surface 121 being convex in a peripheral region and a concave image-side surface 122, and the object-side surface 121 is thereof being aspheric.

The third lens element 130 with negative refractive power has an object side surface 131 being concave in a peripheral region and both the object-side surface 131 and the image-side surface 132 are aspheric.

The fourth lens element 140 with positive refractive power has an object-side surface 141 being concave in a paraxial region and a convex image-side surface 142.

The fifth lens element 150 with positive refractive power has an image-side surface 152 being concave in a paraxial region and convex in a peripheral region. Both the object-side surface 151 and the image-side surface 152 are aspheric.

Figure 2:
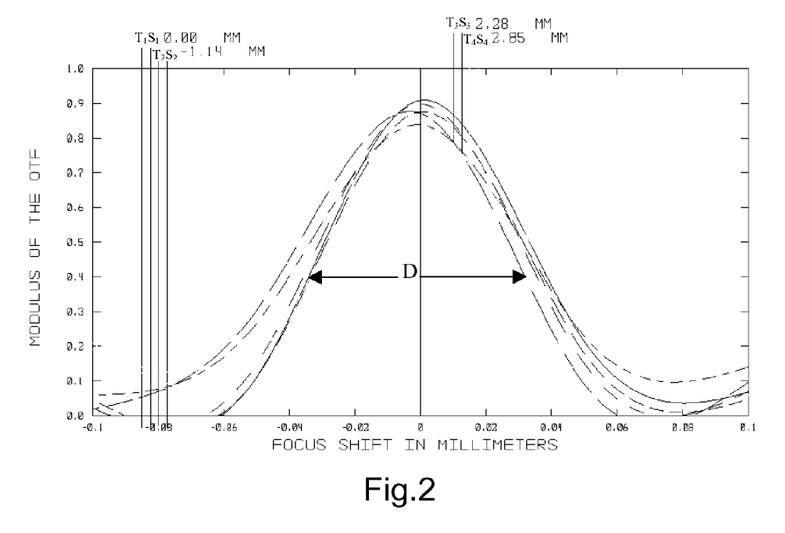
FIG. 2 shows the defocus curve of the first embodiment for the disclosure.
Figure 3:
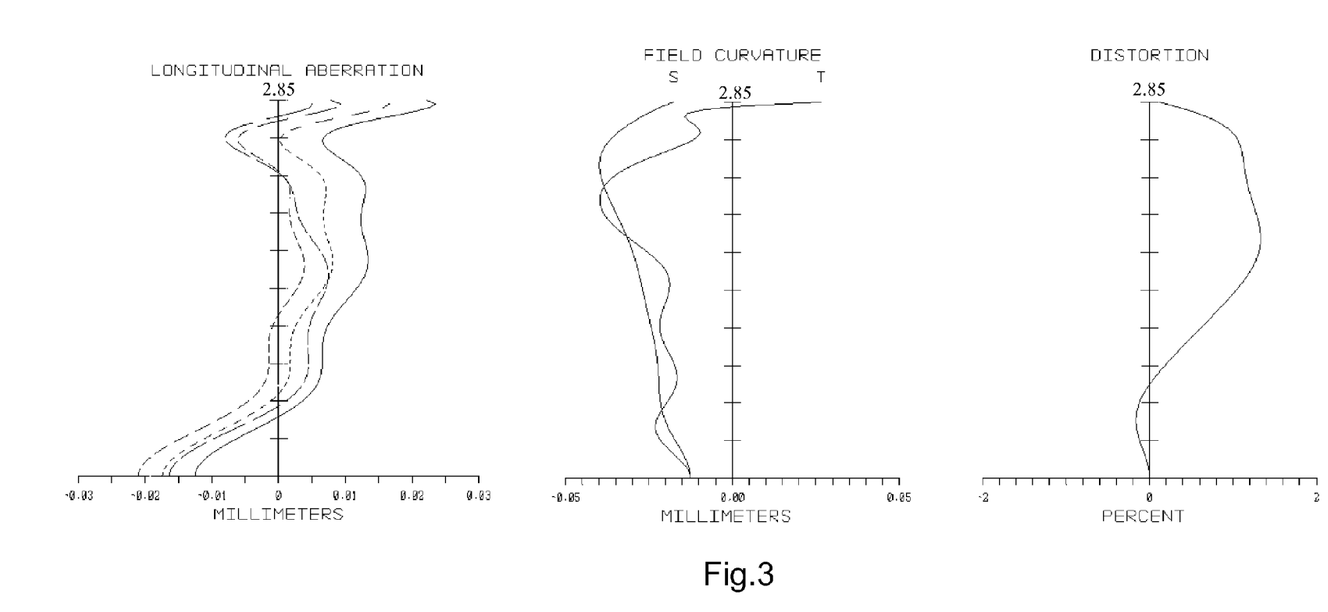
FIG. 3 shows the aberration curves of the first embodiment for the disclosure.

What is revealed in FIG. 2 is the defocus status of the first embodiment. Each defocus curve was measured under one corresponding field which includes sagittal and tangential plane, and we measured defocus curves respectively under 4 different fields include 0.0 mm, −1.14 mm, 2.28 mm, and 2.85 mm. All the embodiments in all disclosures of this invention share the same testing conditions and definition of every parameter, which will not be stated again. It can be seen in FIG. 2 that most peaks of curves located near the zero-shift vertical axis, which means the lens module has a good defocus status so that the effective depth of focus of the lens optical system can achieve a larger maximum value. All the MTF peaks in every field stay in a high value zone, which means a good image contrast is accomplished.

The detailed information of optical imaging module in the first embodiment is shown in TABLE 1-1 and 1-2 below.

TABLE 1-1

Embodiment 1
f = 3.65, F# = 2.25, HFOV = 37.86°,

| | Surface No. | Curvature radius (mm) | Thickness (mm) | Refractive Index (Nd) | Dispersion coefficient (Vd) |
|---|---|---|---|---|---|
| Aperture stop | ~ | ~ | −0.159 | | |
| First lens element | 111 | 1.88 | 0.661 | 1.544 | 55.9 |
| | 112 | −3.83 | 0.008 | | |
| Second lens element | 121 | 7.49 | 0.317 | 1.636 | 23.3 |
| | 122 | 1.64 | 0.405 | | |
| Third lens element | 131 | 4.10 | 0.321 | 1.636 | 23.3 |
| | 132 | 4.33 | 0.307 | | |
| Fourth lens element | 141 | −3.52 | 0.716 | 1.544 | 55.9 |
| | 142 | −0.95 | 0.275 | | |
| Fifth lens element | 151 | 2.50 | 0.281 | 1.544 | 55.9 |
| | 152 | 0.76 | 0.870 | | |
| IR-cut filter | 161 | ~ | 0.21 | 1.517 | 56.8 |
| | 162 | ~ | 0.19 | | |
| Image plane | 170 | ~ | ~ | ~ | ~ |

In TABLE 1-1, f represents the effect focal length, F# represents the F number and HFOV represents the half of maximal field of view of the system in disclosed embodiment. The aspheric coefficients of each surface satisfy the aspheric surface profiles equation and are referred in TABLE 1-2 below where A4 to A16 represent the $4^{th}$ to $16^{th}$-order aspheric coefficient respectively and k is conic index in the aspheric surface profiles equation. All labels for TABLE of the remaining embodiments share the same definitions as those in TABLE 1-1 and TABLE 1-2 in the first embodiment, and their definitions will not be stated again.

Figure 4:
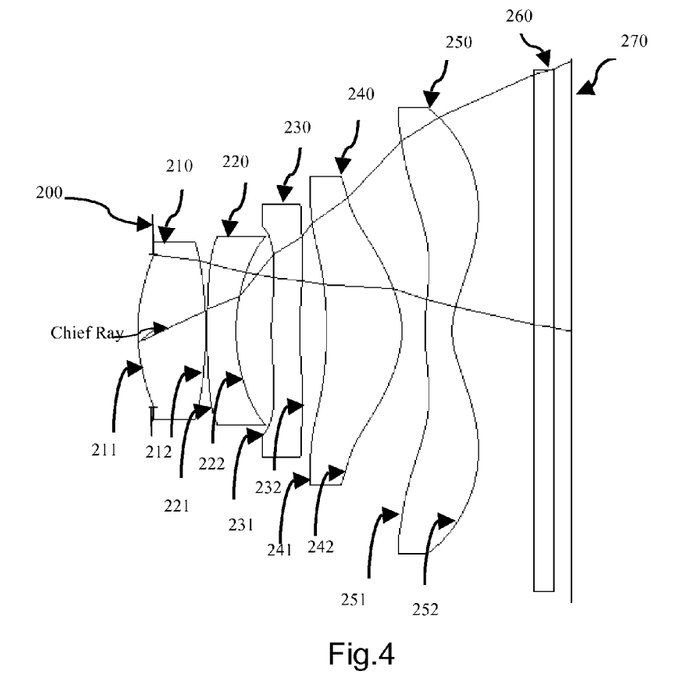
FIG. 4 shows an optical imaging module in accordance with a second embodiment for the disclosure.

With reference to FIG. 4 the optical imaging module in second embodiment of the present invention, sequentially arranged from an object side to an image side along an optical axis, comprises an aperture stop 200, a first lens element 210, a second lens element 220, a third lens element 230, a fourth lens element 240, a fifth lens element 250, an IR-cut filter 260 and an image plane 270, wherein all the lens elements 210, 220, 230,240 and 250 are made of plastic.

The first lens element 210 with positive refractive power has an object side surface 211 being convex in a paraxial region and a convex image side surface 212.

The second lens element 220 with negative refractive power has an object side surface 221 being convex in a peripheral region and a concave image-side surface 222, and the object-side surface 221 is thereof being aspheric.

The third lens element 230 with negative refractive power has an object side surface 231 being concave in a peripheral region and both the object-side surface 231 and the image-side surface 232 are aspheric.

The fourth lens element 240 with positive refractive power has a concave object-side surface 241 and a convex image-side surface 242.

The fifth lens element 250 with positive refractive power has an image-side surface 252 being concave in a paraxial region and convex in a peripheral region. Both the object-side surface 251 and the image-side surface 252 are aspheric.

Figure 5:
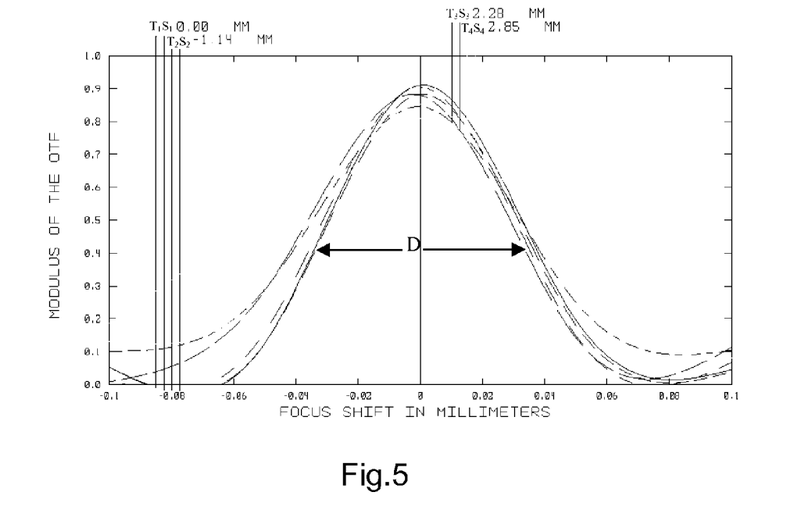
FIG. 5 shows the defocus curve of the second embodiment for the disclosure.
Figure 6:
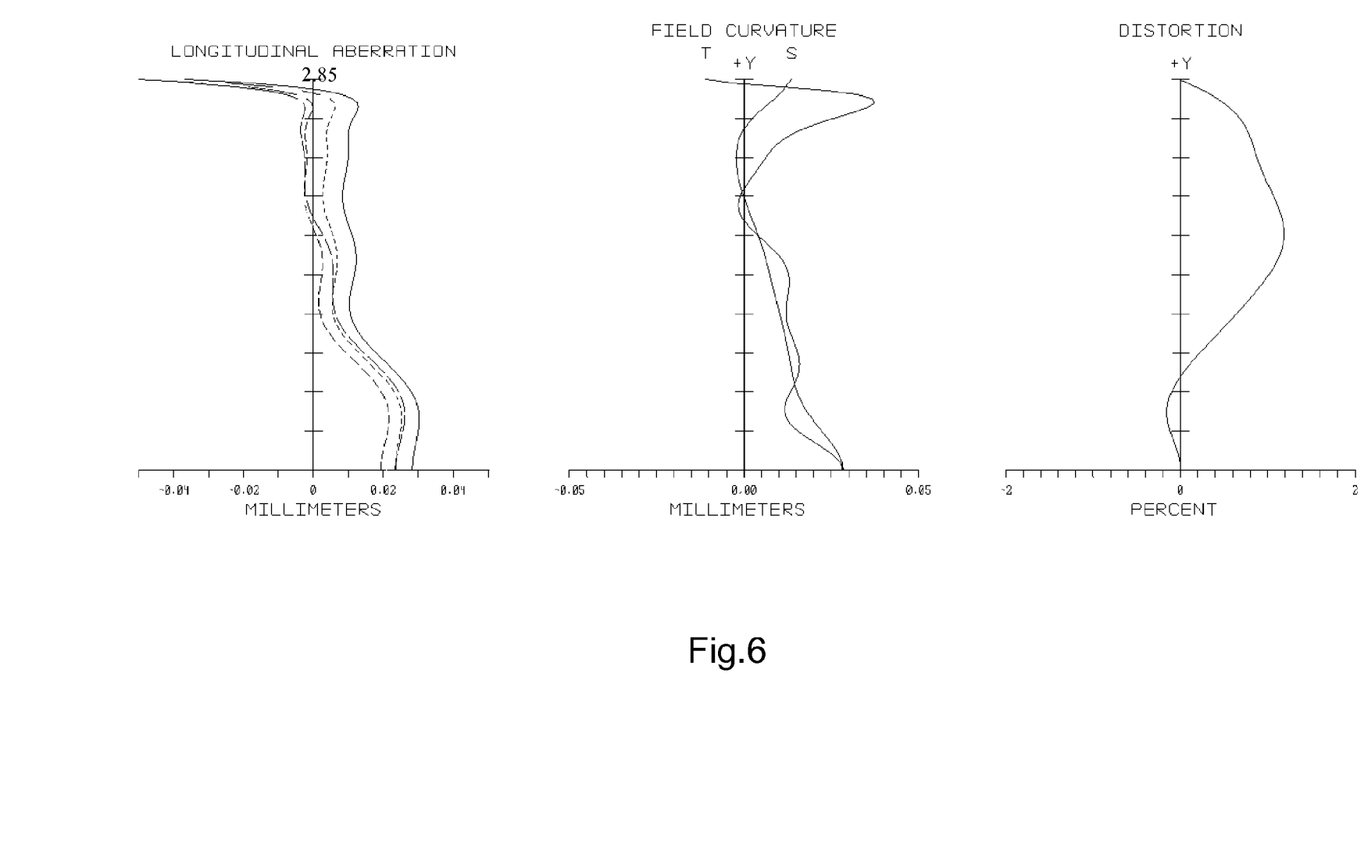
FIG. 6 shows the aberration curves of the second embodiment for the disclosure.

What is revealed in FIG. 5 is the defocus status of the second embodiment. It can be seen in FIG. 5 that most peaks of curves located near the zero-shift vertical axis, which means the lens module has a good defocus status so that the effective depth of focus of the lens optical system can achieve a larger maximum value. All the MTF peaks in every field stay in a high value zone, which means a good image contrast is accomplished.

The detailed information of optical imaging module in the second embodiment is shown in TABLE 2-1 and 2-2 below.

TABLE 1-2

| Aspheric Coefficients | | | | | |
|---|---|---|---|---|---|
| Sur. No. | 111 | 112 | 121 | 122 | |
| k | 0 | −4.877 | 43.998 | 0 | |
| A4 | −6.2226E−02 | −1.1099E−01 | −2.2626E−01 | −2.0898E−01 | |
| A6 | 5.1665E−01 | 1.3501E+00 | 1.7009E+00 | 6.1866E−01 | |
| A8 | −5.0103E+00 | −5.5104E+00 | −6.4236E+00 | −1.3966E+00 | |
| A10 | 2.7018E+01 | 1.0971E+01 | 1.5082E+01 | 3.3622E+00 | |
| A12 | −8.8817E+01 | −1.0375E+01 | −2.3905E+01 | −8.2772E+00 | |
| Sur. No. | 131 | 132 | 141 | 142 | 151 | 152 |
| k | −0.5218 | −1.487 | −0.8491 | −2.303 | −10.25 | −4.414 |
| A4 | −1.6943E−01 | −8.2346E−02 | 1.2196E−01 | 2.3193E−01 | −2.3445E−01 | −1.7474E−01 |
| A6 | −9.6061E−02 | −2.0916E−01 | −2.8745E−01 | −6.4124E−01 | 1.0059E−01 | 1.0871E−01 |
| A8 | 7.4945E−01 | 6.8209E−01 | 3.9485E−01 | 1.0200E+00 | −2.0638E−02 | −5.4122E−02 |
| A10 | −2.1140E+00 | −1.2263E+00 | −3.9769E−01 | −1.1179E+00 | −4.6916E−02 | 1.9306E−02 |
| A12 | 3.5970E+00 | 1.4758E+00 | 3.6096E−01 | 8.4195E−01 | 1.9140E−03 | −4.8218E−03 |
| A14 | −3.8461E+00 | −1.1555E+00 | −2.3690E−01 | −4.0430E−01 | −7.2891E−04 | 8.1914E−04 |
| A16 | 2.4887E+00 | 5.6299E−01 | 9.3314E−02 | 1.1620E−01 | 1.3140E−04 | −8.9608E−05 |

TABLE 2-1

Embodiment 2
f = 3.72, F# = 2.25, HFOV = 37.81°,

| | Surface No. | Curvature radius (mm) | Thickness (mm) | Refractive Index (Nd) | Dispersion coefficient (Vd) |
|---|---|---|---|---|---|
| Aperture stop | ~ | ~ | −0.159 | | |
| First lens element | 211 | 1.85 | 0.720 | 1.544 | 55.9 |
| | 212 | −3.89 | 0.013 | | |
| Second lens element | 221 | 7.50 | 0.305 | 1.636 | 23.3 |
| | 222 | 1.64 | 0.379 | | |
| Third lens element | 231 | 4.20 | 0.299 | 1.636 | 23.3 |
| | 232 | 4.50 | 0.284 | | |
| Fourth lens element | 241 | −3.46 | 0.797 | 1.544 | 55.9 |
| | 242 | −0.96 | 0.244 | | |
| Fifth lens element | 251 | 2.51 | 0.287 | 1.544 | 55.9 |
| | 252 | 0.77 | 0.866 | | |
| IR-cut filter | 261 | ~ | 0.21 | 1.517 | 56.8 |
| | 262 | ~ | 0.19 | | |
| Image plane | 270 | ~ | ~ | ~ | ~ |

TABLE 2-2

Aspheric Coefficients

| Sur. No. | 211 | 212 | 221 | 222 |
|---|---|---|---|---|
| k | 0 | −4.877 | 43.998 | 0 |
| A4 | −3.5240E−02 | −1.1099E−01 | −2.3143E−01 | −2.0898E−01 |
| A6 | 4.0510E−01 | 1.3584E+00 | 1.7009E+00 | 6.1866E−01 |
| A8 | −4.7018E+00 | −5.5104E+00 | −6.4415E+00 | −1.3987E+00 |
| A10 | 2.6708E+01 | 1.0971E+01 | 1.5078E+01 | 3.3400E+00 |
| A12 | −8.8817E+01 | −1.0404E+01 | −2.3892E+01 | −8.2736E+00 |

| Sur. No. | 231 | 232 | 241 | 242 | 251 | 252 |
|---|---|---|---|---|---|---|
| k | −0.5218 | −1.487 | −0.8491 | −2.303 | −10.25 | −4.414 |
| A4 | −1.6201E−01 | −8.2346E−02 | 1.0538E−01 | 2.4763E−01 | −2.2582E−01 | −1.7482E−01 |
| A6 | −9.3624E−02 | −2.0916E−01 | −2.9642E−01 | −6.4793E−01 | 9.5900E−02 | 1.0871E−01 |
| A8 | 7.4636E−01 | 6.8209E−01 | 4.3213E−01 | 1.0067E+00 | −1.5862E−02 | −5.4122E−02 |
| A10 | −2.1213E+00 | −1.2331E+00 | −4.7008E−01 | −1.0961E+00 | −2.0582E−03 | 1.9306E−02 |
| A12 | 3.5968E+00 | 1.4817E+00 | 4.3461E−01 | 8.2705E−01 | 2.4262E−03 | −4.8218E−03 |
| A14 | −3.8461E+00 | −1.1566E+00 | −2.6386E−01 | −3.9959E−01 | −8.9097E−04 | 8.1914E−04 |
| A16 | 2.4814E+00 | 5.6299E−01 | 8.7937E−02 | 1.1600E−01 | 1.7888E−04 | −8.9608E−05 |

Figure 7:
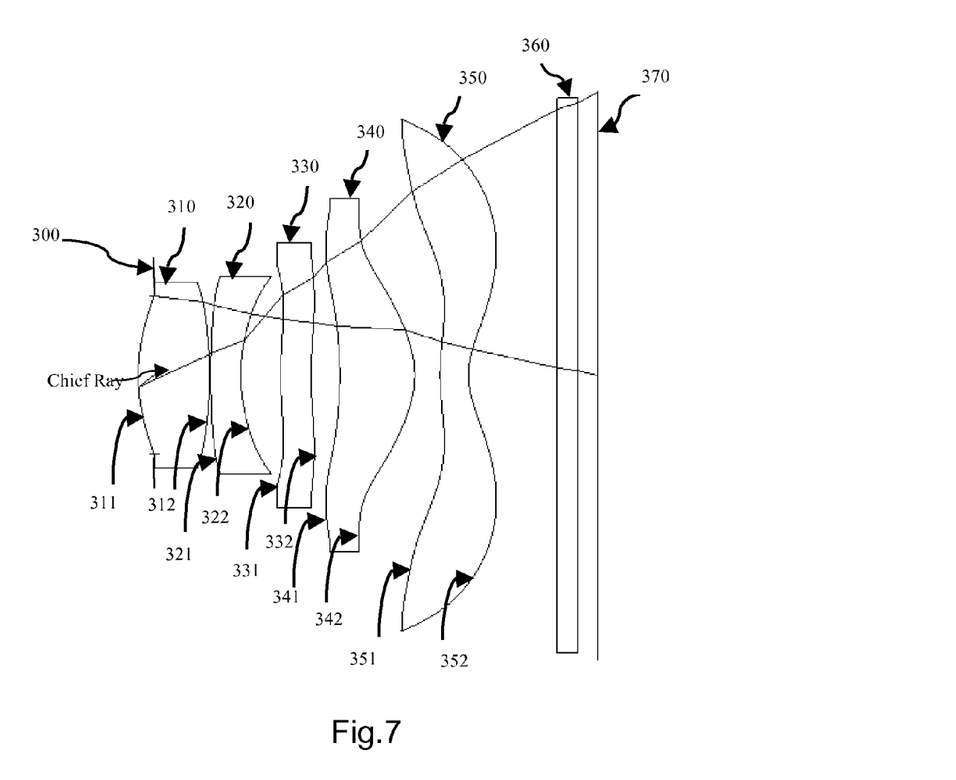
FIG. 7 shows an optical imaging module in accordance with a third embodiment for the disclosure.

Referring to FIG. 7 for the third embodiment of the present invention, the optical imaging module sequentially arranged from an object side to an image side along an optical axis, comprises an aperture stop 300, a first lens element 310, a second lens element 320, a third lens element 330, a fourth lens element 340, a fifth lens element 350, an IR-cut filter 360 and an image plane 370, wherein all the lens elements 310, 320, 330, 340 and 350 are made of plastic.

The first lens element 310 with positive refractive power has a convex object side surface 311 and a convex image side surface 312.

The second lens element 320 with negative refractive power has a concave image-side surface 322, and the object-side surface 321 is thereof being aspheric.

The third lens element 330 with positive refractive power has an object side surface 331 being concave in a peripheral region and both the object-side surface 331 and the image-side surface 332 are aspheric.

The fourth lens element 340 with negative refractive power has a convex image-side surface 342 and an object-side surface 341 being concave in a paraxial region and convex in a peripheral region.

The fifth lens element 350 with positive refractive power has an image-side surface 352 being concave in a paraxial region and convex in a peripheral region. Both the object-side surface 351 and the image-side surface 352 are aspheric.

Figure 8:
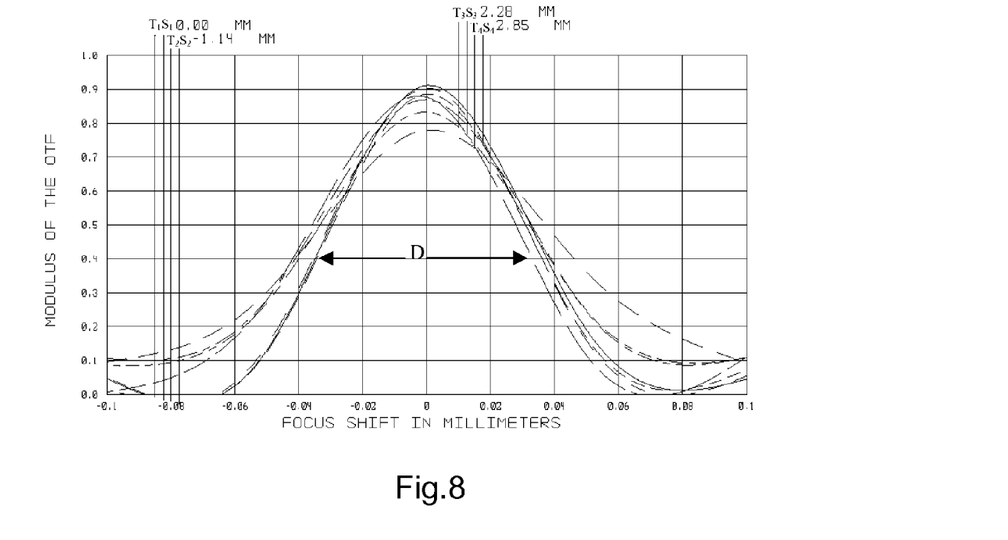
FIG. 8 shows the defocus curve of the third embodiment for the disclosure.
Figure 9:
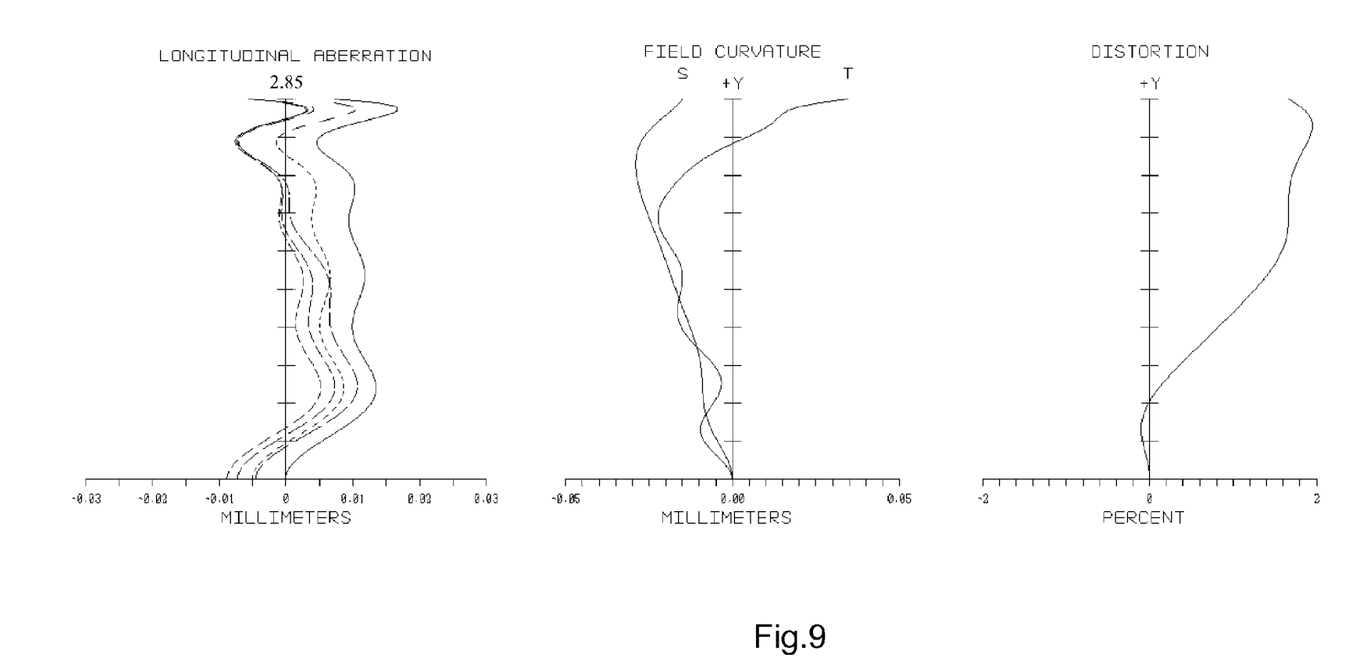
FIG. 9 shows the aberration curves of the third embodiment for the disclosure.

What is revealed in FIG. 8 is the defocus status of the third embodiment. It can be seen in FIG. 8 that most peaks of curves located near the zero-shift vertical axis, which means the lens module has a good defocus status so that the effective depth of focus of the lens optical system can achieve a larger maximum value.

The detailed information of optical imaging module in the third embodiment is shown in TABLE 3-1 and 3-2 below.

TABLE 3-1

Embodiment 3
f = 3.69, F# = 2.25, HFOV = 37.30°,

| | Surface No. | Curvature radius (mm) | Thickness (mm) | Refractive Index (Nd) | Dispersion coefficient (Vd) |
|---|---|---|---|---|---|
| Aperture stop | ~ | ~ | −0.159 | | |
| First lens element | 311 | 1.88 | 0.716 | 1.544 | 55.9 |
| | 312 | −3.83 | 0.013 | | |
| Second lens element | 321 | 7.49 | 0.300 | 1.636 | 23.3 |
| | 322 | 1.64 | 0.402 | | |
| Third lens element | 331 | 4.08 | 0.305 | 1.544 | 55.9 |
| | 332 | 4.34 | 0.288 | | |
| Fourth lens element | 341 | −3.53 | 0.751 | 1.636 | 23.3 |
| | 342 | −0.95 | 0.257 | | |
| Fifth lens element | 351 | 2.46 | 0.284 | 1.544 | 55.9 |
| | 352 | 0.76 | 0.890 | | |
| IR-cut filter | 361 | ~ | 0.21 | 1.517 | 56.8 |
| | 362 | ~ | 0.19 | | |
| Image plane | 370 | ~ | ~ | ~ | ~ |

TABLE 3-2

Aspheric Coefficients

| Sur. No. | 311 | 312 | 321 | 322 | ~ | ~ |
|---|---|---|---|---|---|---|
| k | 0 | −4.877 | 43.998 | 0 | ~ | ~ |
| A4 | −5.4721E−02 | −1.1099E−01 | −2.3762E−01 | −2.0898E−01 | ~ | ~ |
| A6 | 5.1665E−01 | 1.3501E−01 | 1.7009E−01 | 6.1866E−01 | ~ | ~ |
| A8 | −5.0011E+00 | −5.5104E+00 | −6.4415E+00 | −1.3966E+00 | ~ | ~ |
| A10 | 2.7018E+01 | 1.0971E+01 | 1.5082E+01 | 3.3515E+00 | ~ | ~ |
| A12 | −8.8817E+01 | −1.0381E+01 | −2.3905E+01 | −8.2818E+00 | ~ | ~ |

| Sur. No. | 331 | 332 | 341 | 342 | 351 | 352 |
|---|---|---|---|---|---|---|
| k | −0.5218 | −1.487 | −0.8491 | −2.303 | −10.25 | −4.414 |
| A4 | −1.5736E−01 | −8.2346E−02 | 1.1608E−01 | 2.3669E−01 | −2.3375E−01 | −1.7482E−01 |
| A6 | −9.6061E−02 | −2.0916E−01 | −2.8745E−01 | −6.5667E−01 | 1.0059E−01 | 1.0871E−01 |
| A8 | 7.4636E−01 | 6.8209E−01 | 3.9559E−01 | 1.0469E+00 | −2.0586E−02 | −5.4122E−02 |
| A10 | −2.1140E+00 | −1.2376E+00 | −3.9769E−01 | −1.1444E+00 | −4.6916E−05 | 1.9306E−02 |
| A12 | 3.5970E+00 | 1.4817E+00 | 3.6096E−01 | 8.5926E−11 | 1.9140E−03 | −4.8218E−03 |
| A14 | −3.8461E+00 | −1.1555E+00 | −2.3690E−01 | −4.1107E−01 | −7.2891E−04 | 8.1914E−04 |
| A16 | 2.4887E+00 | 5.6299E−01 | 9.3314E−02 | 1.1762E−01 | 1.3140E−04 | −8.9608E−05 |

Figure 10:
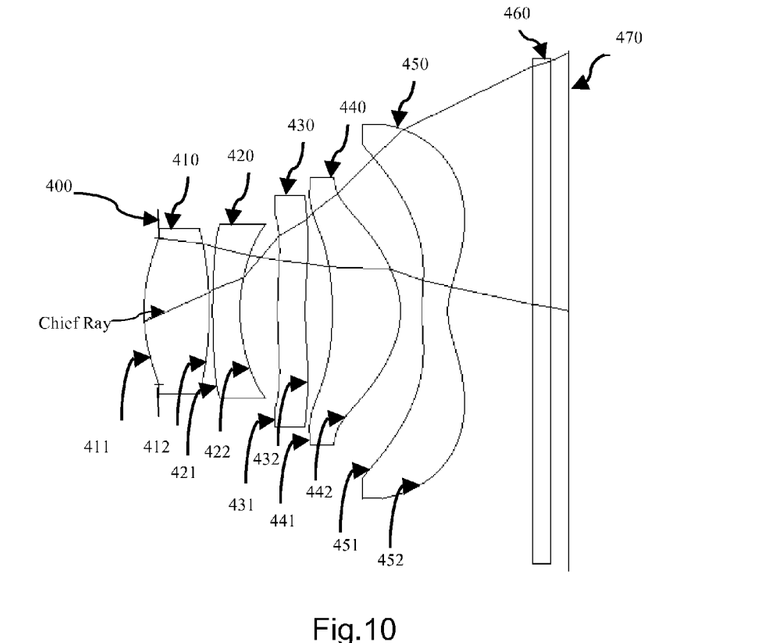
FIG. 10 shows an optical imaging module in accordance with a fourth embodiment for the disclosure.

Referring to FIG. 10 for the fourth embodiment of the present invention, the optical imaging module sequentially arranged from an object side to an image side along an optical axis, comprises an aperture stop 400, a first lens element 410, a second lens element 420, a third lens element 430, a fourth lens element 440, a fifth lens element 450, an IR-cut filter 460 and an image plane 470, wherein all the lens elements 410, 420, 430,440 and 450 are made of plastic.

The first lens element 410 with positive refractive power has a convex image side surface 412 and an object side surface 411 being convex in a paraxial region.

The second lens element 420 with negative refractive power has a concave image-side surface 422 and an object-side surface being convex in a peripheral region, and the object-side surface 421 is thereof being aspheric.

The third lens element 430 with negative refractive power has an object side surface 431 being concave in a peripheral region and both the object-side surface 431 and the image-side surface 432 are aspheric.

The fourth lens element 440 with positive refractive power has a convex image-side surface 442 and an object-side surface 441 being concave in a paraxial region.

The fifth lens element 450 with positive refractive power has an image-side surface 452 being concave in a paraxial region and convex in a peripheral region. Both the object-side surface 451 and the image-side surface 452 are aspheric.

Figure 11:
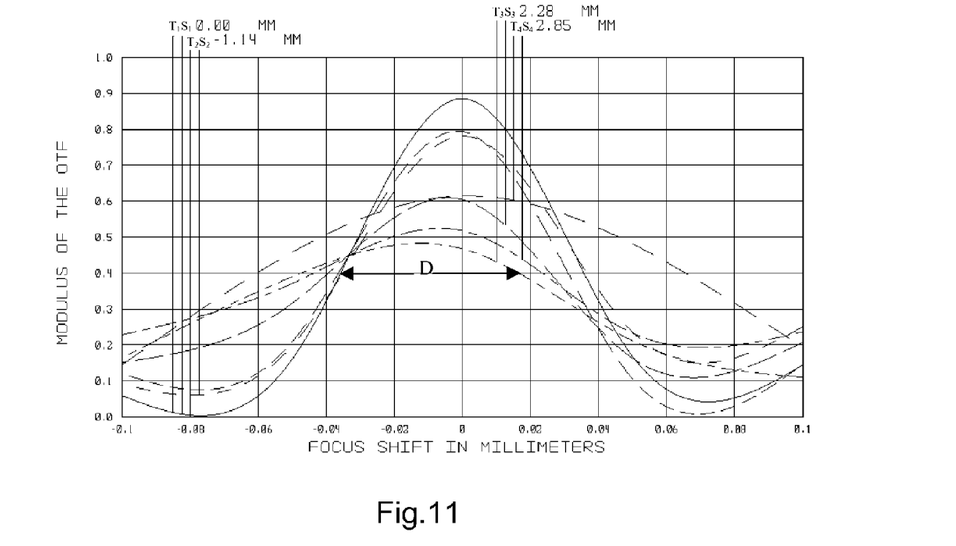
FIG. 11 shows the defocus curve of the fourth embodiment for the disclosure.
Figure 12:
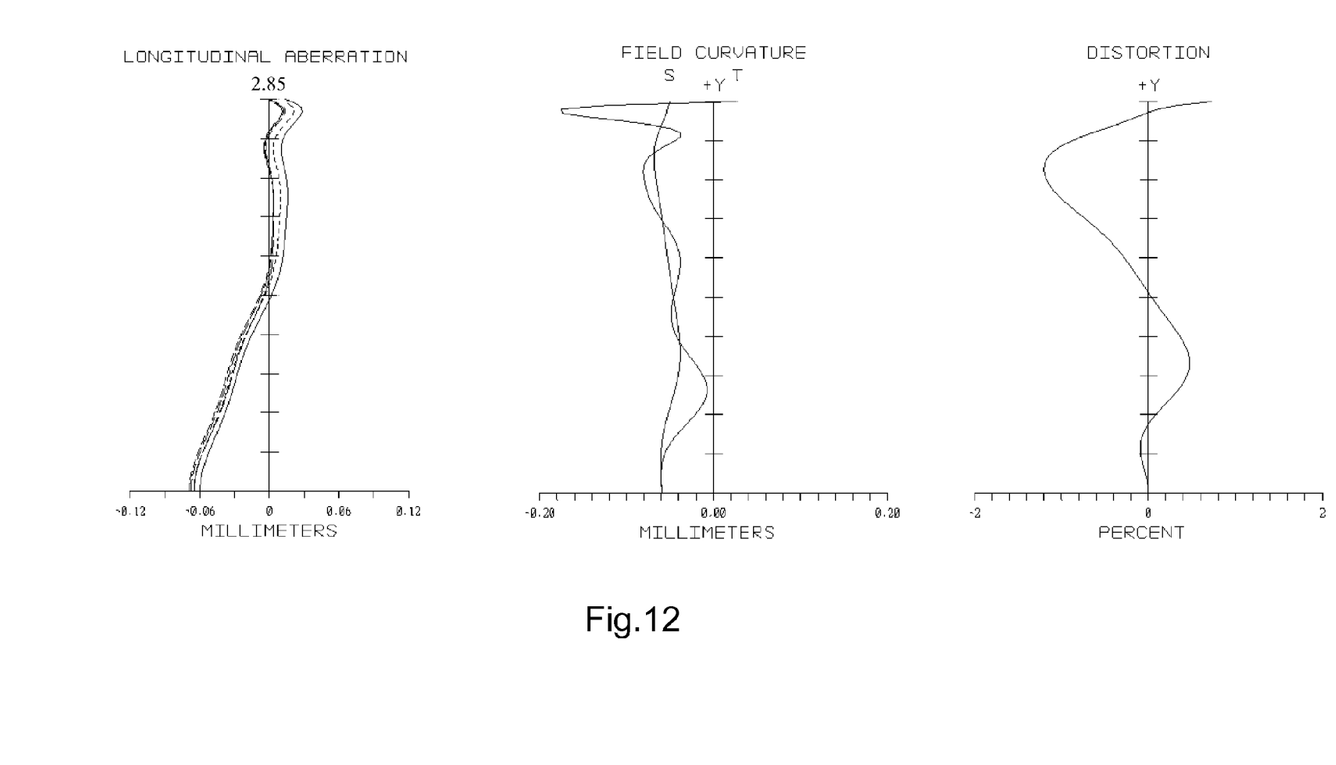
FIG. 12 shows the aberration curves of the fourth embodiment for the disclosure.

What is revealed in FIG. 11 is the defocus status of the fourth embodiment. It can be seen in FIG. 11 that some peaks of curves have considerable decline meanwhile the curve of field 2.28 mm has a shifting of 0.018 mm to the right. The performance of contrast goes down but the effective depth of focus of the lens optical system still has an acceptable value to manufacture.

The detailed information of optical imaging module in the fourth embodiment is shown in TABLE 4-1 and 4-2 below.

TABLE 4-1

Embodiment 4
f = 3.71, F# = 2.25, HFOV = 36.82°,

| | Surface No. | Curvature radius (mm) | Thickness (mm) | Refractive Index (Nd) | Dispersion coefficient (Vd) |
|---|---|---|---|---|---|
| Aperture stop | ~ | ~ | −0.159 | | |
| First lens element | 411 | 1.88 | 0.716 | 1.544 | 55.9 |
| | 412 | −3.83 | 0.039 | | |
| Second lens element | 421 | 7.49 | 0.300 | 1.636 | 23.3 |
| | 422 | 1.64 | 0.413 | | |
| Third lens element | 431 | 4.08 | 0.305 | 1.636 | 23.3 |
| | 432 | 4.34 | 0.299 | | |
| Fourth lens element | 441 | −3.53 | 0.751 | 1.544 | 55.9 |
| | 442 | −0.95 | 0.236 | | |
| Fifth lens element | 451 | 2.46 | 0.284 | 1.544 | 55.9 |
| | 452 | 0.76 | 0.928 | | |
| IR-cut filter | 461 | ~ | 0.21 | 1.517 | 56.8 |
| | 462 | ~ | 0.19 | | |
| Image plane | 470 | ~ | ~ | ~ | ~ |

TABLE 4-2

Aspheric Coefficients

| Sur. No. | 311 | 312 | 321 | 322 | ~ | ~ |
|---|---|---|---|---|---|---|
| k | 0 | −4.877 | 43.998 | 0 | ~ | ~ |
| A4 | −5.4721E−02 | −1.1099E−01 | −2.3762E−01 | −2.0898E−01 | ~ | ~ |
| A6 | 5.1665E−01 | 1.3501E+00 | 1.7009E+00 | 6.1866E−01 | ~ | ~ |
| A8 | −5.0011E+00 | −5.5104E+00 | −6.4415E+00 | −1.3966E+00 | ~ | ~ |
| A10 | 2.7018E+01 | 1.0971E+01 | 1.5082E+01 | 3.3515E+00 | ~ | ~ |
| A12 | −8.8817E+01 | −1.0381E+01 | −2.3905E+01 | −8.2818E+00 | ~ | ~ |

TABLE 4-2-continued

| | Aspheric Coefficients | | | | | |
|---|---|---|---|---|---|---|
| Sur. No. | 331 | 332 | 341 | 342 | 351 | 352 |
| k | −0.5218 | −1.487 | −0.8491 | −2.303 | −10.25 | −4.414 |
| A4 | −1.5736E−01 | −8.2346E−02 | −9.6829E−02 | −6.2697E−02 | −6.3635E−01 | −4.2574E−01 |
| A6 | −9.6061E−02 | −2.0916E−01 | 5.1067E−01 | −3.6325E−02 | 6.9553E−01 | 4.9181E−01 |
| A8 | 7.4636E−01 | 6.8209E−01 | −2.1074E+00 | 2.9285E−02 | −4.5024E−01 | −4.1044E−01 |
| A10 | −2.1140E+00 | −1.2376E+00 | 4.4959E+00 | 2.3317E−02 | 1.6534E−01 | 2.4574E−01 |
| A12 | 3.5970E+00 | 1.4817E+00 | −5.7354E+00 | −3.4302E−02 | −2.7914E−02 | −1.0642E−01 |
| A14 | −3.8461E+00 | −1.1555E+00 | 4.5845E+00 | −1.9949E−03 | −9.0801E−04 | 3.2221E−02 |
| A16 | 2.4887E+00 | 5.6299E−01 | −2.2212E+00 | 2.9137E−02 | 1.0248E−03 | −6.4088E−03 |

The detailed information of optical imaging module in all presented embodiment is shown in TABLE 5 below.

In TABLE 5, D represents the maximum effective focus shifts range under all the defocus curves at 0.4 modulus of the OTF, BFL is the back focal length, TTL is the total track length. AC2, AC6, AC7 and AC9 respectively represent the total aspheric coefficients of 2nd, 6th, 7th and 9th lens surfaces in said optical imaging module. T represents the total center thickness of five lens elements; AT represents the total center air thickness counted from the first lens element to the IR-cut filter. ASUM represents the total aspheric coefficients of 5th, 6th, 7th, 8th, 9th, 10th lens surfaces. $G_2$ is the center thickness of the 2nd lens element; $T_{12}$ is the center air thickness between the 1st lens element and the 2nd lens element. Rm is the absolute sum of negative radius for all the lens elements; Rt is the absolute sum of radius for all the lens elements.

TABLE 5

| | Embodiment | | | |
|---|---|---|---|---|
| | 1 | 2 | 3 | 4 |
| F# | 2.25 | 2.25 | 2.25 | 2.25 |
| BFL | 0.1789 | 0.2198 | 0.1913 | 0.1316 |
| TTL | 4.563 | 4.596 | 4.607 | 4.672 |
| TTL/BFL | 25.50 | 20.91 | 24.08 | 35.50 |
| AC6/AC9 | −0.310 | −0.311 | −0.277 | −0.166 |
| AC7 | 0.049 | 0.030 | 0.044 | −0.570 |
| AC2 | −3.67 | −3.69 | −4.89 | −3.68 |
| ASUM | 0.448 | 0.426 | 0.447 | −0.342 |
| T/AT | 1.23 | 1.35 | 1.27 | 1.23 |
| G2/T12 | 39.3 | 22.8 | 23.3 | 7.8 |
| Rm/Rt | 3.73 | 3.77 | 3.72 | 3.72 |
| D | 0.082 mm | 0.072 mm | 0.074 mm | 0.052 mm |

What is claimed is:

1. An optical imaging module used in portable devices, comprising:
   arranged sequentially from an object side to an image side,
   an aperture stop;
   a first lens element with positive refractive power having a convex object-side surface and a convex image-side surface;
   a second lens element with negative refractive power having a concave image-side surface and a object-side surface being convex in a peripheral region;
   a third lens element with refractive power;
   a fourth lens element with refractive power having a convex image-side surface;
   a fifth lens element with positive refractive power having an image-side surface being concave in a paraxial region and convex in a peripheral region; and an IR-cut filter (infrared-cut filter);
   wherein the optical imaging module used in the portable devices satisfies:
   0.052 mm≤D≤0.082 mm, wherein D represents the maximum effective focus shifts range under all the defocus curves at 0.4 modulus of the OTF (optical transfer function).

2. The optical imaging module used in portable devices according to claim 1, wherein the module further satisfies the following relation:
   −0.311≤AC6/AC9≤−0.166, wherein AC6 and AC9 respectively represent a total-aspheric coefficients of a 6th and 9th lens surfaces in said optical imaging module.

3. The optical imaging module used in portable devices according to claim 1, wherein the module further satisfies the following relation:
   −0.570≤AC7≤0.049, wherein AC7 represents a total aspheric coefficient of a 7th lens surface in said optical imaging module.

4. The optical imaging module used in portable devices according to claim 1, wherein the module further satisfies the following relation:
   −4.89≤AC2≤−3.67, wherein AC2 represents a total aspheric coefficient of a 2nd lens surface in said optical imaging module.

5. The optical imaging module used in portable devices according to claim 1, wherein the module further satisfies the following relation:
   −0.342≤ASUM≤0.448, wherein ASUM represents a total aspheric coefficient of 5th, 6th, 7th, 8th, 9th, 10th lens surfaces in said optical imaging module.

6. The optical imaging module used in portable devices according to claim 1, wherein the module further satisfies the following relation:
   1.23≤T/AT≤1.35, wherein T represents a total center thickness of five lens elements, AT represents a total center air thickness counted from the first lens element to the IR-cut filter.

7. The optical imaging module used in portable devices according to claim 1, wherein the module further satisfies the following relation:
   7.8≤G2/T12≤39.3, wherein G2 is a center thickness of the 2nd lens element, T12 is a center air thickness between the 1st lens element and the 2nd lens element.

8. The optical imaging module used in portable devices according to claim 1, wherein the module further satisfies the following relation:
   20.91≤TTL/BFL≤35.50, wherein TTL is a total track length and BFL is a back focal length of said optical imaging module.

9. The optical imaging module used in portable devices according to claim 1, wherein the module further satisfies the following relation:

$3.72 \leq Rm/Rt \leq 3.77$, wherein Rm is an absolute sum of negative radius for all the lens elements, Rt is an absolute sum of radius for all the lens elements.

\* \* \* \* \*